United States Patent [19]

Rohde

[11] 4,306,448
[45] Dec. 22, 1981

[54] APPARATUS, METHOD AND SYSTEM FOR DETERMINING THE INTEGRITY OF SEALED CONTAINERS

[75] Inventor: LeRoy H. Rohde, Malvern, Pa.

[73] Assignee: The West Company, Phoenixville, Pa.

[21] Appl. No.: 90,527

[22] Filed: Dec. 10, 1979

[51] Int. Cl.³ .......................... G01M 3/00; G01B 5/02
[52] U.S. Cl. ..................................... 73/52; 33/172 R; 209/529; 209/597
[58] Field of Search .................. 73/52, 49.3, 45.4, 37; 33/172 R, 169 B, 169 R; 209/529, 531, 597, 599, 601

[56] References Cited

U.S. PATENT DOCUMENTS

| | | | |
|---|---|---|---|
| 2,512,134 | 6/1950 | Baule | 73/52 X |
| 3,371,781 | 3/1968 | Armbruster et al. | 73/52 X |
| 3,416,360 | 12/1968 | Ochs | 73/52 |
| 3,586,165 | 6/1971 | Keinanen | 73/52 X |
| 3,633,742 | 1/1972 | Melton | 73/37 X |

FOREIGN PATENT DOCUMENTS

| | | | |
|---|---|---|---|
| 474565 | 3/1975 | Australia | 73/52 |
| 788501 | 1/1958 | United Kingdom | 33/172 R |

*Primary Examiner*—Gerald Goldberg
*Assistant Examiner*—Joseph W. Roskos
*Attorney, Agent, or Firm*—Eugene E. Renz, Jr.

[57] ABSTRACT

A method, apparatus and system for testing the integrity of a container sealed by means of a closure comprising a resilient sealing element and a cup-like cap having a top and a depending skirt compressing the sealing element over the discharge opening in the container. The invention consists in measuring the change in thickness of the resilient sealing element resulting from compression of the sealing element on the container and comparing the change in thickness or a value determined therefrom to a predetermined standard known to indicate sufficient compression to provide an acceptable seal. Resilient sealing element thickness is measured by apparatus including a sensing head having an anvil engageable with the closure mounted on an actuator member of a dial indicator. A face of the anvil engages the top of the cap along a circular line adjacent of the corner radius at its juncture to the top of the cap. With the indicator in a set, fixed position, the height of the container closure assembly can be measured and the change in thickness of the sealing element determined by simply noting the difference in the pre- and post- sealing position of the dial indicator.

9 Claims, 10 Drawing Figures

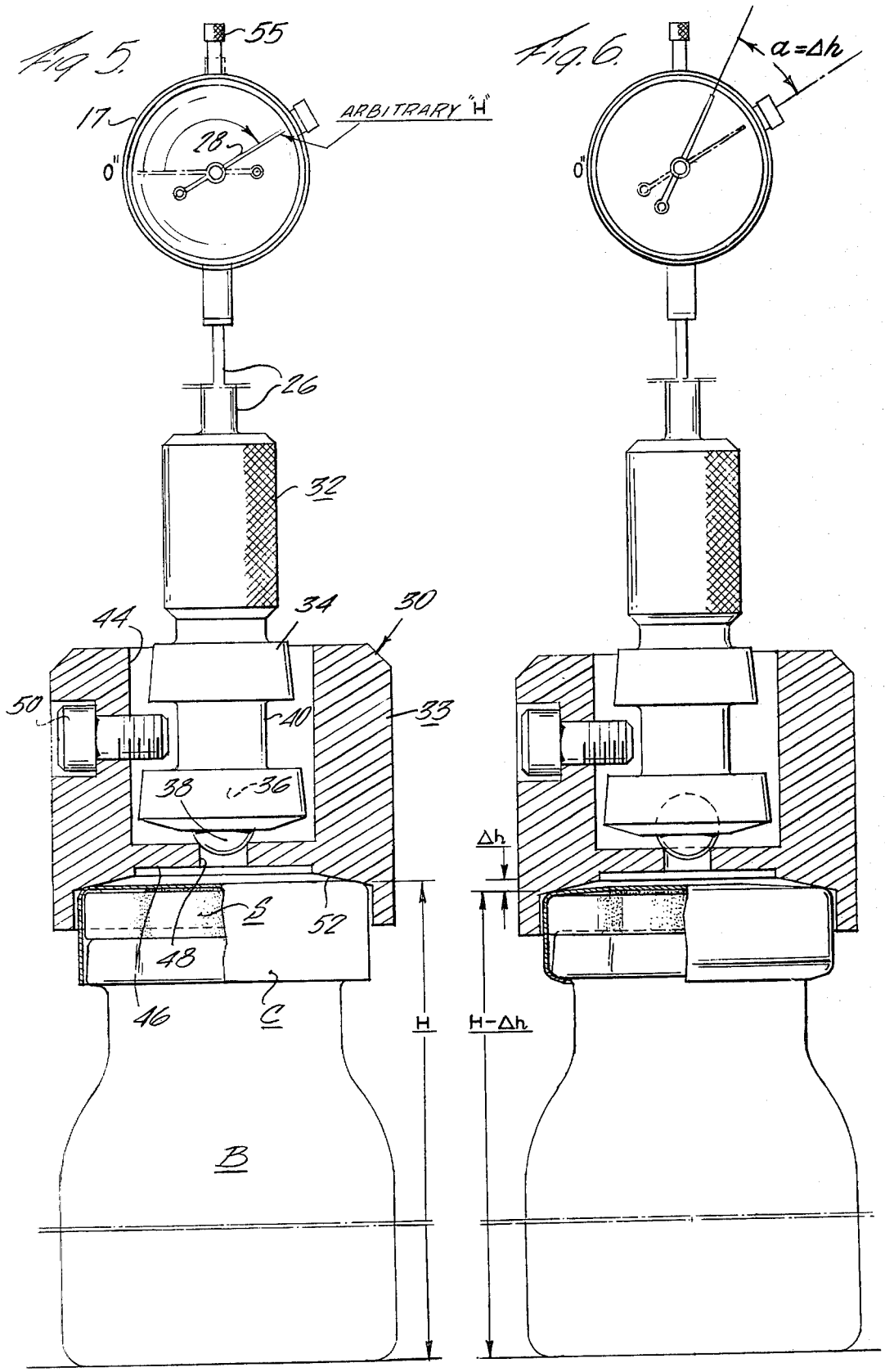

APPARATUS, METHOD AND SYSTEM FOR DETERMINING THE INTEGRITY OF SEALED CONTAINERS

BACKGROUND OF THE INVENTION

The present invention relates to apparatus and a system for determining the integrity of sealed containers. The invention has specific application to parenteral pharmaceutical products which are typically packaged in rigid glass containers sealed with a combination rubber and metal closure.

Such pharmaceutical products are usually packaged by high speed automatic filling and capping equipment. The containers or bottles are filled with the medicament at a filling station and thereafter the closure assembly consisting generally of a rubber sealing element and an aluminum cup-like cap is placed over the discharge end of the container. The capping apparatus then applies a predetermined force to the cap to seat the closure assembly and then crimps the lower edge of the skirt of the cap under or around the bottle finish or flange to seal the container. Proper sealing for medicaments is important to prevent exposure to air or loss by evaporation and also to protect the contents from microbiological or other contamination.

It has been found that some containers packaged by mass production techniques are not adequately sealed. For a given cap, sealing element and container assembly, the seal is controlled primarily by the capping equipment. The capping equipment is initially set to apply a predetermined force to effect the proper seal. Thus if the initial setting of the capping machine is incorrect then the seal produced may be inadequate. Even if the initial setting of the capping equipment is correct, the setting may require adjustment by the operator from time to time and if these changes are inadvertently overlooked, this also may result in containers which are inadequately sealed. Inadequate seals may also result due to the fact that occasionally the various elements of the container assembly combine to comprise a specific assembly with extreme dimensional variation from the mean. This is a statistically predictable occurrence often seen in mechanical assemblies, even though the dimensions of the individual elements are within specified tolerances. Ordinarily, the seal is satisfactory so long as the combined dimension does not depart excessively from the desired mean value. However, in a given instance, if the combined dimension is at a statistical extreme, the seal produced may be unacceptable.

At present the seal integrity is first checked visually and then usually checked further by selecting containers periodically from the assembly line and inspecting them manually by attempting to turn the cap relative to the container.

If the cap does not rotate under the manual force applied, the seal is considered adequate. Such a method is inherently imprecise and subjective since it depends on the strength and judgment of the tester, which may vary from person to person and day to day.

With the foregoing in mind, the present invention is designed to provide apparatus and a system which measures a physical characteristic of the sealed closure system objectively in a manner so that it can be readily and accurately replicated and correlated to the integrity of the seal.

The present invention also provides apparatus and system for checking seal integrity even when the combined dimensional variations in the elements of the container cause it to fall outside the acceptable tolerance range.

Accordingly, it is an object of the present invention to provide a new and useful apparatus and system for checking the seal integrity of a sealed container employing a resilient rubber sealing element.

It is also an object of the present invention to provide such apparatus and system wherein the percent compression of the resilient sealing element can be checked relatively accurately.

It is still another object of the invention to provide a method and apparatus adapted to testing the integrity of seals on either a spot check basis, or on a statistically significant sampling, or on a 100% basis on which every unit is tested.

Another object is to provide such an apparatus and system which is simple, inexpensive and accurate.

A still further object of the present invention is to provide a novel apparatus and system capable of checking seal integrity for different types of closures utilizing a resilient sealing element.

Still another object of the present invention is to provide apparatus and system for checking seal integrity which may be used by operators with minimal skills and still provide accurate results. A further object of the present invention is to provide apparatus and system for checking seal integrity wherein localized engagement of the sensing head and top of the cap ensures accurate pre-seal and post-seal readings and avoids error which may be introduced as a result of "doming" of the center portion of the cap during the sealing operation and wherein the force exerted by the sensing head on the top of the cap is constant for all stroke positions of sensing head on the actual tester.

SUMMARY OF THE INVENTION

The foregoing and other objects of the invention, which will become apparent below are attained by providing an apparatus and system for measuring the seal compression of the rubber sealing element in a sealed container closure as an indication of an adequate seal for the product and container in question. This is accomplished by the apparatus and system of the invention by measuring the height of the container with its rubber sealing element and metal cap in place before and after sealing the container. Inasmuch as the rubber sealing element is axially compressed in thickness by the sealing operation the reduction in thickness (X) is determined by subtracting the height of the sealed container, rubber element and cap from the height of the same elements in unsealed condition. The percentage of compression of the rubber sealing element can then be calculated by dividing the change in height X by the known pre-seal thickness of the rubber sealing element (T) and multiplying by 100 to obtain the percent of rubber element compression (% REC). For any given combination of container, closure and contents of the container, and any post-capping processing or handling, a range of % REC can be determined which provides seals of adequate integrity as determined by other standard tests. The apparatus for determining the axial compression of the rubber element and thus % REC includes a test stand with a planar base on which the container rests, a vertical adjustment column and an indicator gauge actuated by a sensing head in the form of an anvil for detecting the pre-seal and post-seal height of the container. The gauge has either a graduated dial scale for comparing pre-seal and post-seal readings or an indicated area of acceptable predetermined compression value indicating a seal of adequate integrity.

DESCRIPTION OF THE DRAWINGS

The above and other objects of the present invention and various features and details of the operation and construction thereof are hereinafter more fully set forth with reference to the accompanying drawings, wherein:

FIG. 5 is a side elevational view partly in section showing the sensing head engaging a container closure in an uncompressed state;

FIG. 6 is a view similar to FIG. 5 showing the sensing head applied to a sealed closure;

DESCRIPTION OF THE PREFERRED EMBODIMENT

The apparatus and system of the present invention are illustrated and described herein with reference to a typical package for medicaments such as serums. The package includes a bottle B, a rubber sealing element S engaging over the discharge opening in the bottle and a metal overcap C having a top $C_T$ and a peripheral skirt $C_S$ made of a thin gauge aluminum so that the skirt can be crimped under the bottle finish to maintain the element S in a compressed state. The invention also has application to other types of assemblies incorporating a resilient sealing element.

Figure 1:
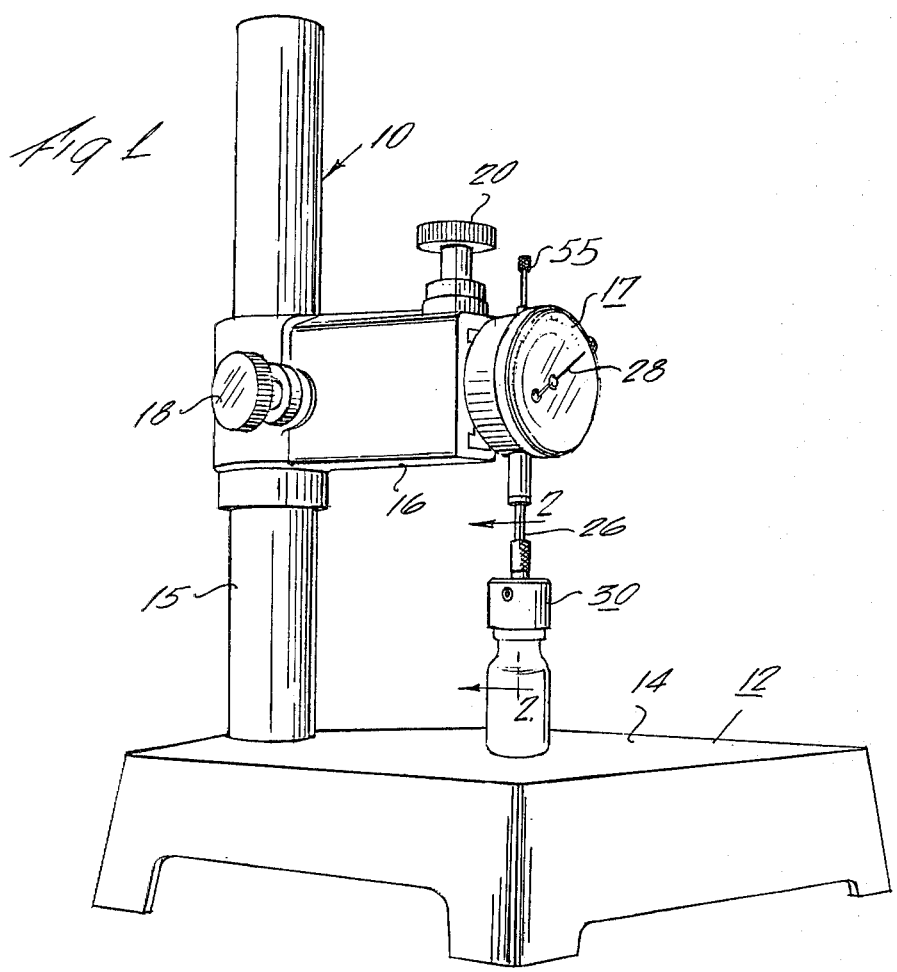
FIG. 1 is a perspective view of seal testing apparatus in accordance with the present invention.
Figure 2:
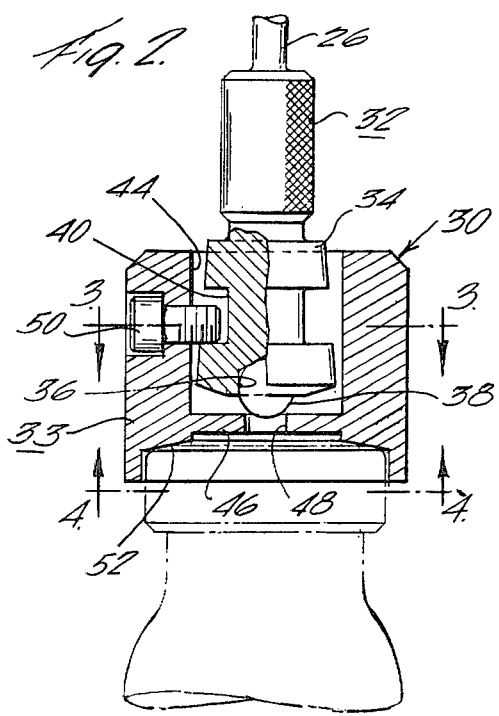
FIG. 2 is an enlarged side elevational view partly in section of the universally mounted sensing head of the apparatus.
Figure 3:
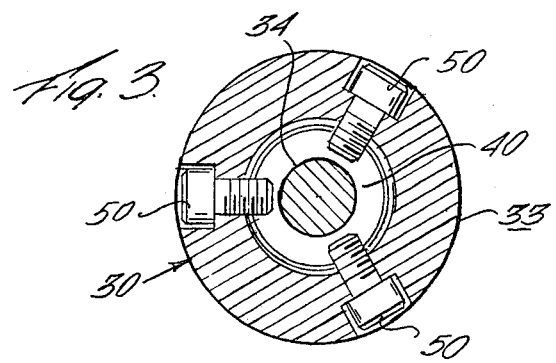
FIGS. 3 and 4 are sectional views taken on lines 3—3 and 4—4 respectively of FIG. 2.
Figure 4:
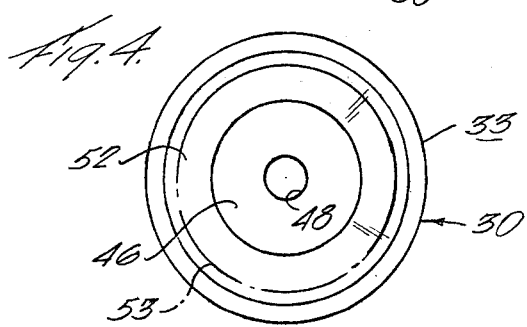
Figure 8:
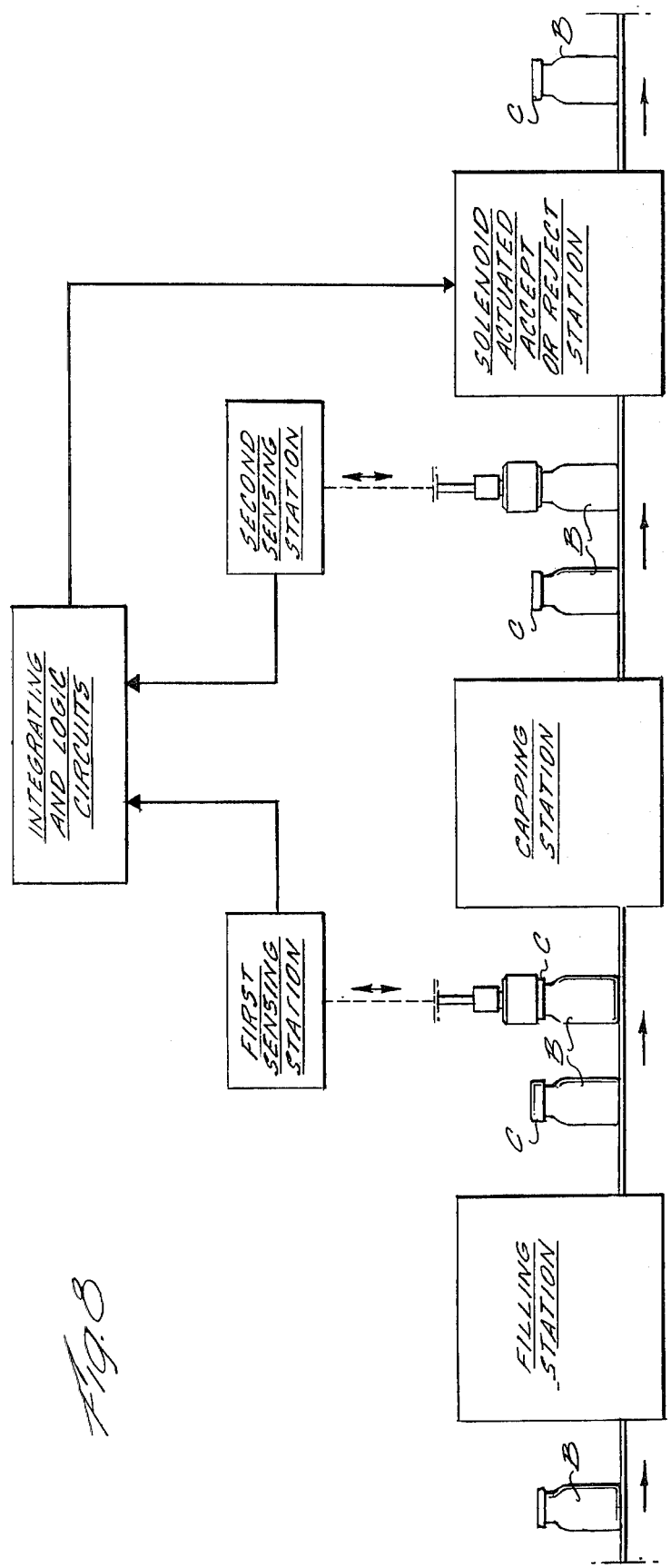
FIG. 8 is a schematic view showing the apparatus and system of the present invention adapted for 100% inspection.

Referring now to the drawings and particularly to FIG. 1 thereof, the seal testing apparatus of the present invention is generally designated by the numeral 10. As illustrated, the apparatus comprises a test stand 12 having a flat planar base 14 on which the containers to be tested rest, a vertical adjustment column or shaft 15 and a gauge mounting arm 16 for an indicator gauge 17. Adjustment screws 18 and 20 permit adjusting the gauge vertically and horizontally relative to the column. The gauge 17 which, in the present instance, is a dial indicator is mounted on the outer extremity of the arm 16. The indicator includes an actuator arm or rod 26 which is displaceable in a vertical direction and is connected by internal mechanisms with the indicator needle 28 to provide a reading of the vertical displacement of the actuator arm 26. FIG. 8 is a schematic view showing the apparatus and system of the present invention adapted for 100% inspection.

In accordance with the present invention, a universally mounted sensing head assembly 30 comprising a stem 32 and an anvil 33 is mounted at the lower terminal end of the actuator arm of the dial indicator in the manner shown. The stem 32 of the assembly as illustrated, is externally threaded so that it may be connected to the lower terminal end of the actuator arm or rod 26. The lower end of which stem is a universal fitting 34 which has a pocket 36 at its lower terminal end for mounting a ball 38. The body of the fitting has a central annular groove 40 to serve as a loose mounting means for the anvil 33. The anvil 33, as illustrated, is of generally cylindrical shape and has a central bore 44 for receiving the universal fitting. The bore 44 terminates in an end wall 46 having a circular opening 48 therein of a diameter smaller than the ball 38 providing a seat for the ball. In the present instance, three screws 50 engage through the side-wall of the anvil 33 so that their terminal ends engage in the annular groove 40 of the universal fitting 34 in a manner permitting a limited oscillating and axial displacement of the anvil 33 relative to the universal fitting 34. Spaced downwardly from the end wall 46 of the anvil 33 is a conical feeler wall 52 which is downwardly divergent and is of a predetermined included angle $\alpha$ of between approximately 140° and 150° so that it engages the aluminum closure cap approximately at the vertical center line of its corner radius in the manner illustrated in FIG. 5. More specifically the anvil engages the cap along a circular line 53 located closely adjacent radially outwardly of the tangent T to the rounded corner of the cap at the juncture of the top $C_T$ and skirt $C_S$, the tangent coinciding with the plane of the top in the relaxed state of the cap.

Figure 7:
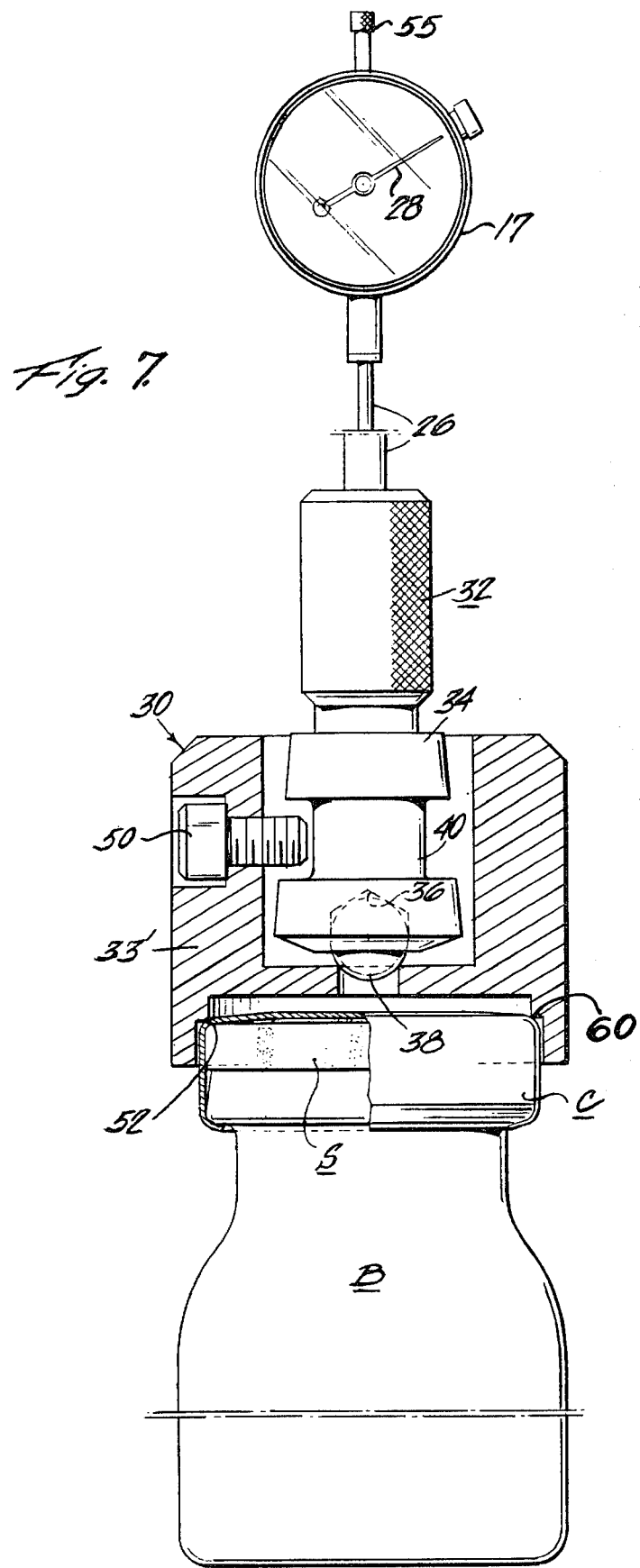
FIG. 7 is a transverse cross sectional view showing a modified anvil construction.

FIG. 7 shows a modified anvil construction wherein the feeler wall 52 instead of being conical is of a stepped configuration defining a shoulder 60 which engages the top of the cap along the circular line 53 in the manner described above. The location of the contact line 53 between the anvil and cap is important for accurate displacement readings. With the contact line at this location, variations in displacement reading due, for example, to "doming" are minimized.

In accordance with another feature of the present invention, the force exerted by the sensing head assembly over its full displacement range is substantially uniform. This is due to the fact that the actuator rod is connected to the dial indicator 28 simply by a meshing gear arrangement and does not utilize a spring biasing means which is typical of conventional gauges.

Before describing the basic principle of operation of the apparatus and system of the present invention it is observed that the resilient rubber sealing element S under mechanical loading behaves in the nature of an incompressible fluid altering its shape elastically at constant volume and that when there is a predetermined percent axial compression of the sealing element S, an effective seal is provided. The percent compression is related to the displacement of the top surface of the sealing element S which takes place under mechanical loading. For example, a given displacement differential of the top surface of the sealing element S equalling a predetermined percentage of the uncompressed thickness of S, such as 25 percent (25%), is taken to indicate that a seal of the required integrity exists. The apparatus of the present invention functions in the following manner to measure such a displacement differential. Initially the container B with the sealing element S and uncrimped overcap C are placed on the base of the test stand in the condition illustrated in FIG. 5. The operator then selects the proper sensing head assembly for the given container closure assembly to be tested and assembles it to the actuator arm 26. The mounting assembly is then adjusted on the column 15 so that the sensing head seats on the closure as illustrated in FIG. 5 and produces a positive upward displacement of the actuator arm 26 which in turn effects rotation of the dial indicator 28 to the arbitrary H position shown at essentially zero (0) compression of the sealing element. In this position the tapered face 52 engages the outer periphery of the cap along the circular line 53. The particular universal mounting of the anvil on the fitting provides a uniform contact about the periphery of the cap at the location indicated. Since the force exerted by the sensing head is essentially only the weight of the sensing head and actuator arm and does not include a variable spring force if the actuator rod 26 were spring biased, the arbitrary H dimension will be essentially the same for any position of the actuator rod 26 relative to the dial indicator 17. The sensing head is then elevated by engaging the knob or handle 55 and raising it upwardly. The container B is then sealed in the manner described above in automatic capping equiment, such as a WESTCAPPER, wherein an axial load is applied to the cap to compress the sealing element S and then the lower edge of the skirt is crimped under or around the finish or flange on the container. WESTCAPPER is a registered trademark of The West Company, Registration No. 1,023,128. The automatic capping equipment is, of course, set to apply a certain force and effect a predetermined displacement of the sealing element S ($\Delta H$) for assemblies having the same nominal H-dimension. However, due to capping machine adjustment variations and manufacturing tolerance differential in the various elements such as the container B, sealing element S and overcap C, the $\Delta H$-displacement may vary for assemblies having the same nomial H-dimension prior to sealing the closure. With pre-seal H-dimension known, the sealed container is then again placed on the test stand and the sensing head is lowered to a position wherein the conical feeler wall 52 engages the outer periphery of the cap along the circular line 53 adjacent the corner radius of the top of the cap. Note that in this position the dial indicator is then read by the operator to determine $\Delta H$. When $\Delta H$ is within a predetermined range, the seal possesses the desired integrity. Note that the particular shape of the sensing surface and the locus of its engagement with the outer cap ensure the most precise reading of the displacement without introducing any error due to crowning of the top of the cap during the capping operation.

If desired, the face of the gauge may be reset to zero (0) for the pre-sealing measurement. It is also to be understood that a plurality of containers may all be processed for pre-sealing measurements, sealed and then processed as a group for the post-sealing measurement. In this instance the operator carefully notes and correlates pre-sealing and post-sealing measurements for each container closure assembly to ensure proper calculation of $\Delta H$.

The seal compression apparatus and system of the present invention were used experimentally to determine the % REC required to achieve an acceptable seal. In this experiment a group of containers fitted with loose rubber sealing elements and metal caps were weighed on an accurate laboratory balance to determine the tare weight of each assembly. Then each container was carefully filled with the nominal volumetric amount of contents for that given bottle. Technical grade isopropyl alcohol was the fill product. This material was preferred to distilled water because of its greater volatility and rate of evaporation at room temperature. After filling, the sealing element and metal cap were replaced on the bottles and a pre-seal reading taken to determine the H-dimension using the seal compression tester of the present invention. Each container was then sealed to achieve a full spectrum of % REC which typically varied from zero (0) where the closure was simply held against the top of the container by gravity to a maximum of about 35 percent (35%). In testing, the % REC was, of course, determined by a post-seal reading using the seal compression tester. The final step was to take a gross weight following sealing, again using an accurate laboratory balance. This value allowed calculation of the net weight of fill product and also served as the initial gross weight prior to extended storage of the sealed containers. The gross weight of each individual container was then recorded for a given time period; typically readings were taken weekly and monthly. These tests showed that the loss of isopropyl alcohol vs. time varied linearly indicating a constant rate of loss. This linearity appears to be a constant phenomenon regardless of other variables. Another observation was a very orderly progression of the rate of loss of alcohol from lowest to highest values of % REC. There was a significant rapid change in loss rate with very light rubber element compression in the range of between zero percent (0%) and ten percent (10%) REC and a relatively small change in loss rate between about ten percent (10%) and thirty-five percent (35%) REC. In the latter range, the loss of fill product was less than about one per cent (1%) after about four (4) months. The data accumulated also shows that there is a definite area of change of trend between low REC's and high REC's as shown in the curves illustrated in FIGS. 9 and 10.

Figure 9:
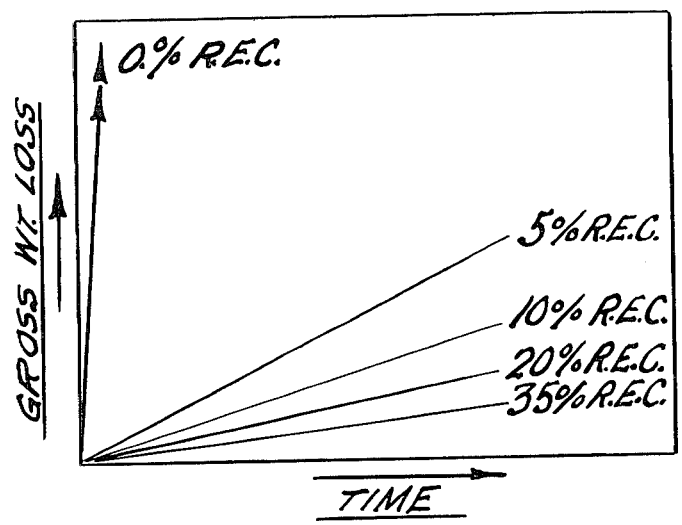
FIG. 9 is a chart plotting gross weight loss against time for various percents REC.
Figure 10:
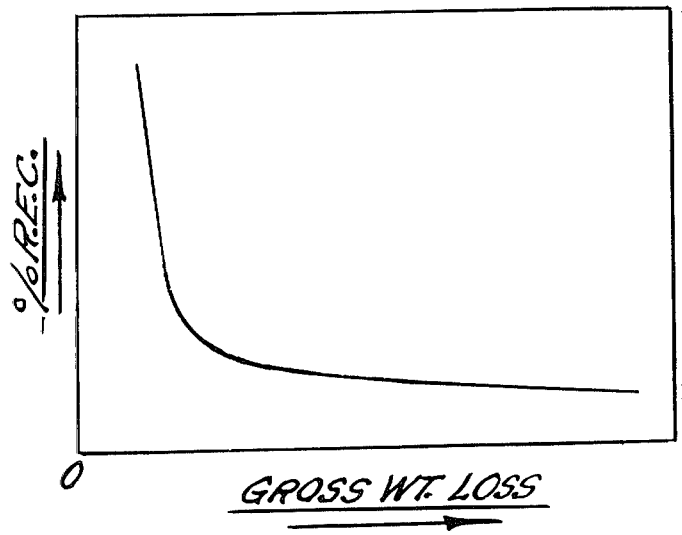
FIG. 10 is a chart plotting percent REC and gross weight loss.

It is apparent from the curves illustrated in FIGS. 9 and 10 that there is an area of % REC below which there is substantial weight loss and above which the weight loss is small or negligible. Therefore, once the REC on a given container exceeds a threshhold value, for example, in the range of fifteen and twenty percent (15-20%), further increases in REC have relatively little effect in decreasing the loss of fill material. In view of this, it would appear that compression values as high as about thirty-five percent (35%) are not necessary. At these high levels of compression, metal seal distortion, "dimpling" of the top surface of the rubber element and glass breakage most frequently occur. In view of the above, for a specific container and closure system, a given fill product and specific post-sealing processing and handling procedures, a maximum value of REC as well as a threshhold value for REC could be established that would respectively avoid distortion, dimpling and breakage problems and yet ensure an adequate seal. Then the seal compression tester may be provided with a blank dial face that merely indicates a zero (0) position and two (2) red lines spaced apart from the zero (0) that show where the needle should fall for an individual container to be within the acceptable range of REC for that specific type of container assembly and product. In this manner the tester would essentially be a go/no-go gauge for seal integrity.

With reference to FIG. 6, dimension X ($\Delta H$) is the change of the overall height of the container as determined by subtracting the overall height after sealing from the overall height before sealing. X is, therefore, also the axial reduction in thickness of the sealing element due to compression by the capping operation. X may be converted to REC simply by dividing it by T, the nominal uncompressed thickness of the rubber sealing element S and multiplying it by 100 to convert the decimal to percent. The measuring apparatus is designed so that the small measuring force from the apparatus and the doming of the metal cap during the sealing operation do not affect the value of X significantly. Of course, as noted above, it is essential that the same set of components, that is, metal seal, rubber sealing element and glass bottle are used for the pre- and post-sealing measurements. This eliminates any normal production variation in the combined heights of these elements.

The seal test apparatus and system of the present invention are primarily designed for use as spot checking devices in production applications or in laboratory use. It is to be understood, however, that the apparatus and system may be adapted for in-line operation to permit 100% inspection in production applications; for example, by locating a first test apparatus between the filling and capping equipment and a second test apparatus downstream of the capping equipment and integrating the first and second test units to provide means for accepting or rejecting each of the sealed containers processed in the line. The means may consist of a visual or an audible signal or a mechanism for automatically diverting and rejecting those sealed containers which are not adequately sealed. FIG. 8 illustrates schematically a system of this type.

In summary, the present invention provides test apparatus which is of relatively simple and durable design capable of producing accurate results when used by even unskilled operators and which does not require a protective environment for use.

What is claimed is:

1. A method for testing the integrity of the seal of a container sealed by means of a closure comprising a resilient sealing element and a mechanical element compressing said sealing element and locking the same in sealed relationship to said container, which comprises
    measuring the change in thickness of said resilient sealing element resulting from compression of said element in the sealing of said container,
    comparing said change in thickness or a value determined therefrom to a predetermined standard known to indicate sufficient compression to provide an acceptable seal.

2. The method of claim 1 wherein the mechanical element can be made to maintain the resilient element in an axially compressed state against the mouth of the container thereby permitting measurement of the amount of axial compression.

3. The method of claim 1 wherein the percent compression of the sealing element is determined by dividing the difference in thickness of the element before and after compression by the thickness of the element prior to compression and multiplying by 100 and using said percentage as the value for comparison to a predetermined standard.

4. Apparatus for testing the integrity of a container (B) sealed by means of a closure comprising a resilient sealing element (S) and a cup-like cap (C) having a top and a depending skirt compressing said sealing element over the discharge opening in the container comprising means for measuring the change in thickness of the resilient sealing element resulting from compression including indicator means having a moveable actuator member (26) and visual indicia means showing changes in position of said actuator member, a sensing head assembly (30) including an anvil mounted on said actuator member adapted for limited universal movement, said anvil having a face (52) confronting the top of the cap to engage the same along a circular line adjacent to the tangent of the corner radius at its juncture to the top of the cap.

5. Apparatus as claimed in claim 4 wherein said face (52) is essentially conical and outwardly divergent at an included angle of between approximately 140° and 150°.

6. Apparatus as claimed in claim 4 wherein said face (52) is of a stepped configuration defining an annular shoulder (60).

7. Apparatus as claimed in claim 4 wherein said sensing head assembly exerts a predetermined uniform force on the closure for substantially the entire range of movement of said actuator member.

8. Apparatus as claimed in claim 4 wherein the stem has an annular recess and said anvil includes stop means engaging in said recess thereby to limit relative axial movement of the stem and anvil and wherein said stem includes a ball engageable in a seat in an end wall of the anvil.

9. A system for testing the integrity of the seal of a container sealed by means of a closure comprising a resilient sealing element and a cap of cup-like form having a top and a depending skirt compressing said sealing element and locking the same in sealed relationship to the container comprising first measuring the height of the container before compression of the sealing element by apparatus including a base supporting the container, a sensing head engaging the cap and an indicator actuatable by the sensing head to provide a first visual indicia corresponding to the container height before compression of the seal, sealing the container and then again measuring the height of the container by said apparatus providing a second visual indicia corresponding to the container height after compression of the seal, correlating the difference between said first and second indicia and the precompression thickness of the sealing element and comparing it to a predetermined standard known to indicate sufficient compression to provide an adequate seal.

* * * * *